US012573145B2

(12) United States Patent
Kallio et al.

(10) Patent No.: US 12,573,145 B2
(45) Date of Patent: Mar. 10, 2026

(54) PIPELINE DELAY REDUCTION FOR COARSE VISIBILITY COMPRESSION

(71) Applicant: ADVANCED MICRO DEVICES, INC., Santa Clara, CA (US)

(72) Inventors: Kiia K. Kallio, Inkoo (FI); Anton Palm, Ulvila (FI)

(73) Assignee: Advanced Micro Devices, Inc., Santa Clara, CA (US)

( * ) Notice: Subject to any disclaimer, the term of this patent is extended or adjusted under 35 U.S.C. 154(b) by 126 days.

(21) Appl. No.: 17/855,268

(22) Filed: Jun. 30, 2022

(65) Prior Publication Data

US 2024/0005602 A1 Jan. 4, 2024

(51) Int. Cl.
| | |
|---|---|
| *G06T 17/00* | (2006.01) |
| *G06T 1/60* | (2006.01) |
| *G06T 9/00* | (2006.01) |
| *G06T 17/10* | (2006.01) |

(52) U.S. Cl.
CPC ................ G06T 17/10 (2013.01); G06T 1/60 (2013.01); G06T 9/001 (2013.01)

(58) Field of Classification Search
CPC ........... G06T 17/10; G06T 1/60; G06T 9/001; G06T 15/005
See application file for complete search history.

(56) References Cited

U.S. PATENT DOCUMENTS

| | | | | |
|---|---|---|---|---|
| 6,414,680 B1 * | 7/2002 | Klosowski | .............. | G06T 15/20 |
| | | | | 345/423 |
| 6,657,635 B1 * | 12/2003 | Hutchins | ................... | G06T 1/60 |
| | | | | 711/135 |

| | | | | |
|---|---|---|---|---|
| 8,558,842 B1 * | 10/2013 | Johnson | ................ | G06T 15/005 |
| | | | | 345/581 |
| 8,669,982 B2 * | 3/2014 | Breeds | .................. | G06T 11/206 |
| | | | | 345/440 |
| 8,704,836 B1 * | 4/2014 | Rhoades | ................. | G06T 11/40 |
| | | | | 345/553 |

(Continued)

FOREIGN PATENT DOCUMENTS

| | | | | |
|---|---|---|---|---|
| KR | 20200145673 A | * | 12/2020 | ........... G06T 15/005 |

OTHER PUBLICATIONS

U.S. Appl. No. 17/565,394, filed Dec. 29, 2021, Entitled "Synchronization Free Cross Pass Binning Through Subpass Interleaving", 35 pages.

(Continued)

*Primary Examiner* — Sarah Lhymn

(57) ABSTRACT

A processing system divides an image to be rendered into one or more tiles and performs a visibility pass on the primitives of the image. During the visibility pass, the processing system generates visibility data for each primitive of a draw call of the image based on a visible primitive count and a visible draw call count. In response to a primitive of the draw call being visible in the first tile, the processing system increments the visible primitive count and generates visibility data indicating that the primitives of the draw call are to be rendered using draw call index data stored in an on-chip memory. If the primitive is the first visible primitive of the draw call, the processing system further increments the visible draw call count. Additionally, the processing system renders the primitives of the draw call using the draw call index data stored in the on-chip memory.

20 Claims, 6 Drawing Sheets

(56)  References Cited

U.S. PATENT DOCUMENTS

| 9,704,270 | B1* | 7/2017 | Main | G06T 15/60 |
|---|---|---|---|---|
| 2012/0293519 | A1* | 11/2012 | Ribble | G06T 1/20 |
| | | | | 345/501 |
| 2014/0139534 | A1* | 5/2014 | Tapply | G06T 11/40 |
| | | | | 345/522 |
| 2015/0325037 | A1* | 11/2015 | Lentz | G06T 15/005 |
| | | | | 345/419 |
| 2017/0091897 | A1 | 3/2017 | Lee et al. | |
| 2017/0140573 | A1 | 5/2017 | Woo | |
| 2017/0178401 | A1* | 6/2017 | Agrawal | G06T 15/005 |
| 2018/0018992 | A1 | 1/2018 | Starr | |
| 2018/0189923 | A1* | 7/2018 | Zhong | G06T 15/005 |
| 2018/0292897 | A1* | 10/2018 | Wald | G06F 3/011 |
| 2019/0197760 | A1 | 6/2019 | Cho et al. | |
| 2020/0013137 | A1* | 1/2020 | Hammerstone | G06T 15/005 |
| 2020/0020067 | A1* | 1/2020 | Liang | G06T 15/005 |
| 2020/0151847 | A1* | 5/2020 | Schluessler | G06T 17/10 |
| 2020/0327740 | A1* | 10/2020 | Frommhold | G06F 3/011 |
| 2021/0065422 | A1* | 3/2021 | Croxford | G06T 15/20 |
| 2021/0225060 | A1 | 7/2021 | Tuomi et al. | |
| 2022/0036629 | A1 | 2/2022 | Tuomi et al. | |
| 2022/0101479 | A1 | 3/2022 | Alla et al. | |
| 2022/0261075 | A1* | 8/2022 | Wald | G06F 3/013 |
| 2022/0309735 | A1* | 9/2022 | Bigos | G06V 10/87 |
| 2022/0319111 | A1* | 10/2022 | Uhrenholt | G06T 15/005 |
| 2023/0385983 | A1* | 11/2023 | Kvasnica | G06N 3/09 |

OTHER PUBLICATIONS

U.S. Appl. No. 17/851,611, filed Jun. 28, 2022, Entitled "Binning Pass With Hierarchical Depth Data Determination" 44 pages.
U.S. Appl. No. 17/853,136, filed Jun. 29, 2022, Entitled "Hierarchical Depth Data Generation Using Primitive Fusion" 61 pages.
International Search Report and Written Opinion mailed Nov. 7, 2023 for PCT/US2023/026691, 11 pages.
International Preliminary Report on Patentability mailed Jan. 9, 2025 for PCT/US2023/026691, 8 pages.
Extended European Search Report mailed Feb. 14, 2025 for European Application No. 23832384.4, 9 pages.

* cited by examiner

PIPELINE DELAY REDUCTION FOR COARSE VISIBILITY COMPRESSION

BACKGROUND

In a graphics processing system, three-dimensional scenes are rendered by accelerated processing units for display on two-dimensional displays. To render such scenes, the graphics processing system receives a command stream from an application indicating various primitives to be rendered for the scene. The graphics processing system then renders these primitives according to a graphics pipeline that has different stages each including instructions to be performed by the graphics processing system. The graphics processing system then displays the rendered primitives as part of a three-dimensional scene displayed in a two-dimensional display.

To help reduce the time needed to render primitives for a scene, the graphics processing system divides the scene into multiple tiles and performs a visibility pass for the scene to generate visibility data for each tile. Based on the visibility data, the graphics processing system generates and compresses data that is later used to render the primitives for the scene, reducing the time needed to render the primitives. However, waiting for the graphics processing system to make the compressed data available for use introduces delays in the graphics pipeline, which lowers the efficiency of the system.

BRIEF DESCRIPTION OF THE DRAWINGS

The present disclosure may be better understood, and its numerous features and advantages are made apparent to those skilled in the art by referencing the accompanying drawings. The use of the same reference symbols in different drawings indicates similar or identical items.

DETAILED DESCRIPTION

Figure 1:
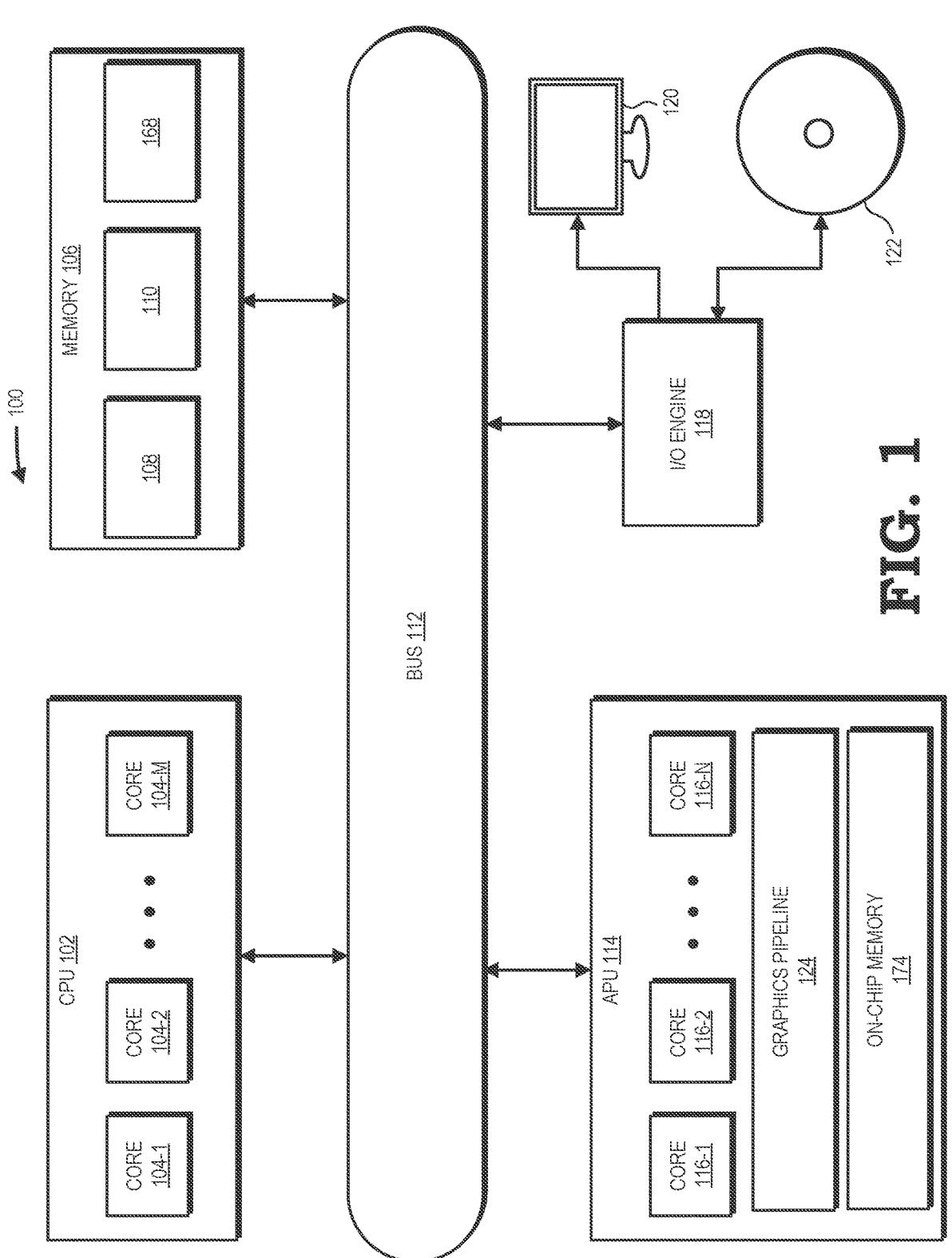
FIG. 1 is a block diagram of a processing system configured to reduce pipeline delays due to coarse visibility compression, in accordance with some embodiments.

To help reduce the time needed for a processing system to render primitives of an image, a processing system performs coarse visibility compression by first generating and compressing visibility data for each primitive of the image and then using the compressed visibility data to render the primitives. To this end, the processing system (e.g., accelerated processing unit (APU), central processing unit (CPU), memory) operates in a standard mode and first divides the image into two or more tiles (e.g., bins). While in the standard mode, the processing system then performs a visibility pass for the tiles of the image by determining whether each primitive of the image is visible (e.g., present) in each tile of the image. In response to a primitive not being visible in a tile, the processing system generates visibility data indicating that the primitive is not visible in the tile, the draw call associated with the primitive is not visible in the tile, or both and that the primitive, the draw call, or both should not be rendered for the tile. In response to a primitive being visible in the tile, the processing system generates visibility data indicating, for example, vertex data, shading data, positioning data, or any combination thereof, of the primitive. Once visibility data is generated by the processing system, the processing system compresses the visibility data and stores the compressed visibility data in a buffer associated with the tile. The processing system next flushes the compressed visibility data from the buffer, for example, in response to the visibility pass being completed (e.g., the processing system has determined whether each primitive is or is not visible in the tiles of the image) and stores the flushed visibility data in a memory. The processing system then uses the flushed visibility data to render primitives in the image. By using the compressed visibility data to render the primitives, the time needed to render the primitives is reduced. However, waiting to render the primitives until after the compressed visibility data has been flushed from the buffer introduces delays in the graphics pipeline used to render the primitives.

To this end, techniques and systems described herein address reducing delays in the graphics pipeline due to coarse visibility compression. To reduce such delays, one or more parts of a processing system (e.g., APU, CPU) operates in a pipeline delay reduction mode. While in the pipeline delay reduction mode, the processing system keeps a visible primitive count (e.g., indicating the current number of primitives determined to be visible in a first tile) and a visible draw call count (e.g., indicating the current number of draw calls issued for primitives determined to be visible in a first tile). Further, the processing system divides an image to be rendered into two or more tiles and performs a visibility pass for the image by determining whether each primitive of one or more draw calls for an image is visible (e.g., present) in each tile of the image. In response to none of the primitives indicated in a draw call being present in a tile, the processing system generates visibility data indicating that the draw call, the primitives in the draw call, or both are not visible in the tile and should not be rendered for the tile. In response to a primitive of a draw call being visible in the tile (e.g., the first tile rendered after a visibility pass), the processing system increments the visible primitive count and generates visibility data including the draw call index data of the draw call (e.g., a pointer to the draw call, a number of indices in the draw call) and indicating that the primitive, at least part of the draw call, or both are visible in the tile and are to be rendered using the draw call index data. Additionally, in response to a primitive of a draw call being visible in the tile (e.g., the first tile rendered after a visibility pass), the processing system increments the visible draw call count and marks the draw call as visible (e.g., generates a flag indicating a visible draw call) if no preceding primitives (e.g., a primitive for which visibility has already been determined in the tiles) associated with the same draw call as the primitive (e.g., current primitive) were visible in the tile. That is to say, the processing system increments the visible draw call count and marks the draw call as visible if the primitive is the first visible primitive in a draw call.

Additionally, while in the pipeline delay reduction mode, the processing system stores the generated visibility data (e.g., for the first tile rendered after a visibility pass) in a data structure (e.g., an array) in a memory (e.g., an on-chip memory, cache). The processing system then renders the primitives for one or more draw calls using the generated visibility data. For example, for each draw call marked as visible in the visibility data, the processing system renders the primitives based the draw call index data. In response to the visible primitive count, visible draw call count, or both being equal to or exceeding a binning threshold, the processing system switches to operating in the standard mode. That is the say, the processing system then switches to generating and compressing visibility data for use in the rendering of the remaining primitives. In this way, the processing system renders a predetermined number of primitives (e.g., based on the visible primitive count, visible draw call count, or both) using uncompressed index data while a visibility pass is performed, visibility data is flushed from a buffer, or both. As such, the processing system does not need to wait for compressed visibility data to be flushed from a buffer before rendering primitives according to a graphics pipeline, reducing delays in the graphics pipeline due to coarse visibility compression and increasing the efficiency of the processing system.

FIG. 1 is a block diagram of a processing system 100 configured to reduce pipeline delays due to coarse visibility compression, according to some implementations. The processing system 100 includes or has access to a memory 106 or other storage component implemented using a non-transitory computer-readable medium, for example, a dynamic random-access memory (DRAM). However, in implementations, the memory 106 is implemented using other types of memory including, for example, static random-access memory (SRAM), nonvolatile RAM, and the like. According to implementations, the memory 106 includes an external memory implemented external to the processing units implemented in the processing system 100. The processing system 100 also includes a bus 112 to support communication between entities implemented in the processing system 100, such as the memory 106. Some implementations of the processing system 100 include other buses, bridges, switches, routers, and the like, which are not shown in FIG. 1 in the interest of clarity.

The techniques described herein are, in different implementations, employed at accelerated processing unit (APU) 114. APU 114 includes, for example, vector processors, coprocessors, graphics processing units (GPUs), general-purpose GPUs (GPGPUs), non-scalar processors, highly parallel processors, artificial intelligence (AI) processors, inference engines, machine learning processors, other multithreaded processing units, scalar processors, serial processors, or any combination thereof. The APU 114 renders images according to one or more applications 110 for presentation on a display 120. For example, the APU 114 renders objects (e.g., textures) to produce values of pixels that are provided to the display 120, which uses the pixel values to display an image that represents the rendered objects. To render the objects, the APU 114 implements a plurality of processor cores 116-1 to 116-N that execute instructions concurrently or in parallel. For example, the APU 114 executes instructions from a graphics pipeline 124 using a plurality of processor cores 116 to render one or more textures. According to implementations, one or more processor cores 116 operate as SIMD units that perform the same operation on different data sets. Though in the example implementation illustrated in FIG. 1, three cores (116-1, 116-2, 116-N) are presented representing an N number of cores, the number of processor cores 116 implemented in the APU 114 is a matter of design choice. As such, in other implementations, the APU 114 can include any number of cores 116. Some implementations of the APU 114 are used for general-purpose computing. The APU 114 executes instructions such as program code 108 for one or more applications 110 stored in the memory 106 and the APU 114 stores information in the memory 106 such as the results of the executed instructions.

The processing system 100 also includes a central processing unit (CPU) 102 that is connected to the bus 112 and therefore communicates with the APU 114 and the memory 106 via the bus 112. The CPU 102 implements a plurality of processor cores 104-1 to 104-N that execute instructions concurrently or in parallel. In implementations, one or more of the processor cores 104 operate as single instruction, multiple data (SIMD) units that perform the same operation on different data sets. Though in the example implementation illustrated in FIG. 1, three cores (104-1, 104-2, 104-M) are presented representing an M number of cores, the number of processor cores 104 implemented in the CPU 102 is a matter of design choice. As such, in other implementations, the CPU 102 can include any number of cores 104. In some implementations, the CPU 102 and APU 114 have an equal number of cores 104, 116 while in other implementations, the CPU 102 and APU 114 have a different number of cores 104, 116. The processor cores 104 execute instructions such as program code 108 for one or more applications 110 stored in the memory 106 and the CPU 102 stores information in the memory 106 such as the results of the executed instructions. The CPU 102 is also able to initiate graphics processing by issuing draw calls to the APU 114. In implementations, the CPU 102 implements multiple processor cores (not shown in FIG. 1 in the interest of clarity) that execute instructions concurrently or in parallel.

In embodiments, the APU 114 is configured to render one or more objects (e.g., textures) for an image to be rendered according to a graphics pipeline 124. A graphics pipeline 124 includes, for example, one or more steps, stages, or instructions to be performed by APU 114 in order to render one or more objects for an image to be rendered. For example, a graphics pipeline 124 includes data indicating an assembler stage, vertex shader stage, hull shader stage, tessellator stage, domain shader stage, geometry shader stage, binner stage, rasterizer stage, pixel shader stage, and output merger stage to be performed by APU 114 in order to render one or more textures. According to embodiments, graphics pipeline 124 has a frontend that includes one or more stages of graphics pipeline 124 and a backend including one or more other stages of graphics pipeline 124. As an example, graphics pipeline 124 has a frontend including one or more stages associated with tile-based (e.g., bin-based) rendering (e.g., assembler stage, vertex shader stage, hull shader stage, tesselator stage, domain shader stage, geometry shader stage, binner stage) and a backend including one or more stages associated with pixel-based rendering (e.g., rasterizer stage, pixel shader stage, output merger stage). In embodiments, APU 114 is configured to perform at least a portion of the frontend of graphics pipeline 124 concurrently with at least a portion of the backend of graphics pipeline 124. For example, APU 114 is configured to perform one or more stages of a frontend of graphics pipeline 124 associated with tile-based rendering currently with one or more stages of a backend of graphics pipeline 124 associated with pixel-based rendering.

To render one or more objects, APU 114 uses original index data 168 when executing at least a portion of graphics pipeline 124. For example, APU 114 uses original index data 168 when executing the frontend of graphics pipeline 124 that includes stages associated with tile-based rendering. Original index data 168 includes, for example, data representing vertices of one or more primitives of an object (e.g., texture) to be rendered by APU 114. In embodiments, APU 114 is configured to use original index data 168 to assemble, position, shade, or any combination thereof, one or more primitives according to graphics pipeline 124. To help increase the performance of the frontend of graphics pipeline 124, processing system 100 compresses index data before it is used by APU 114 to assemble, position, or shade one or more primitives. As an example, before APU 114 is configured to execute at least a portion of graphics pipeline 124, APU 114 is configured to perform a visibility pass to compress index data for primitives of the image. A visibility pass includes, for example, first dividing an image to be rendered into two or more tiles (e.g., bins). Each tile, for example, includes a first number of pixels of the image to be rendered in a first direction (e.g., horizontal direction) and a second number of pixels of the image to be rendered in a second (e.g., vertical direction). After the image is divided into tiles, the visibility pass includes APU 114 determining a number of primitives to be rendered. For example, APU 114 determines a number of primitives to be rendered based on a command stream indicating a batch of draw calls received by an application 110. For the primitives determined from each draw call indicated in the command stream, APU 114 performs one or more stages of the frontend of graphics pipeline 124. As an example, APU 114 performs an assembler stage and one or more shader stages for a primitive determined from a draw call of the command stream. After one or more stages of the frontend of graphics pipeline 124 are performed for one or more primitives determined from the draw calls indicated in the command stream, APU 114 then determines if each primitive of a draw call is present (e.g., visible) in each tile (e.g., bin) of the image and provides visibility data for the primitive to a respective memory (e.g., a buffer). For example, in response to determining that at least a portion of a primitive is present (e.g., visible) in a tile, APU 114 provides visibility data indicating vertex data, shading data, positioning data, or any combination thereof, of the primitive to a respective buffer (e.g., a buffer associated with the tile). Additionally, in response to determining that a primitive is not present (e.g., visible) in the tile, APU 114 provides visibility data indicating the primitive is not present (e.g., visible) in the tile.

According to embodiments, CPU 102, APU 114, or both are configured to compress visibility data before it is stored in a respective buffer. For example, CPU 102, APU 114, or both are configured to compress data relating to the vertices (e.g., pointers to a vertex buffer) of a primitive visible in a tile before the data relating to the vertices is stored in a buffer. In embodiments, CPU 102, APU 114, or both are configured to flush visibility data out of a buffer in response to a threshold event. Such threshold events include, for example, a predetermined period of time (e.g., nanoseconds, milliseconds, seconds, minutes) elapsing, APU 114 completing the visibility pass for the image, or both. CPU 102, APU 114, or both flush visibility data out of a buffer into memory 106, for example, such that the flushed visibility data is available as compressed index data for the frontend of graphics pipeline 124. That is to say, APU 114 is configured to use visibility data flushed from a buffer into memory 106 as compressed index data instead of original index data 168 when performing one or more stages of graphics pipeline 124.

After APU 114 has completed the visibility pass and visibility data has been flushed from one or more buffers, APU 114 is configured to render primitives in each tile (e.g., bin) using the compressed index data (e.g., flushed visibility data) and according to graphics pipeline 124. As an example, after completing the visibility pass for each tile of an image and flushing the buffers of visibility data, APU 114 renders primitives in a first tile using compressed index data and according to the stages of graphics pipeline 124. Once all the primitives in the first tile are rendered, APU 114 renders primitives, for example, in a next sequential tile (e.g., second tile) using compressed index data and according to the stages of graphics pipeline 124. APU 114 renders primitives by tile (e.g., bin) until the primitives in each tile are rendered. By waiting for the visibility pass to be completed and the visibility data to be flushed from the buffers before rendering primitives, APU 114 helps ensure that compressed index data from the visibility pass will be in memory 106 before APU 114 begins rendering primitives. However, waiting to render the primitives until after the visibility data is flushed introduces a delay in the pipeline between the completion of the visibility pass and the rendering of the primitives. To help reduce such delays, APU 114 is configured to operate in a pipeline delay reduction mode.

A pipeline delay reduction mode includes, for example, APU 114 rendering one or more visible primitives in a first tile while a visibility pass is being conducted, visibility data is being flushed to a memory, or both. To render one or more visible primitives in a tile while a visibility pass is being conducted, visibility data is being flushed to a memory, or both, CPU 102, APU 114, or both, are configured to keep a visible primitive count, a visible draw call count, or both for a first tile (e.g., bin). A visible primitive count indicates, for example, the number of currently determined visible primitives in the first tile, and a visible draw call count indicates, for example, the number of draw calls including one or more currently determined visible primitives. Based on the visible primitive count and the visible draw call count, APU 114 is configured to render a predetermined number of visible primitives, visible draw calls, or both in a first tile using draw call index data (e.g., a pointer to the draw call, a number of indices in the draw call) stored, for example, on an on-chip memory, and render the remaining visible primitives in the first tile using visibility data (e.g., compressed index data) flushed from a buffer. For example, CPU 102, APU 114, or both first receive a command stream from an application 110 indicating a batch of draw calls for an image to be rendered. Based on the draw calls, APU 114 performs a visibility pass for the image. In response to no primitives associated with a draw call being present (e.g., visible) in the first tile of the image, APU 114 provides data (e.g., a flag) indicating that the draw call is not visible in the first tile and the primitives of the draw call are not to be rendered for the first tile to a data structure (e.g., array) stored in an on-chip memory 174 (e.g., RAM, SRAM, DRAM, synchronous dynamic random-access memory (SDRAM), read-only memory (ROM), programmable read-only memory (PROM), electronically erasable programmable read-only memory (EEPROM), flash memory). In response to a primitive being present in the first tile, APU 114 stores the draw call index data associated with the primitive in on-chip memory 174, buffer associated with the first tile, or both and provides data (e.g., a flag) indicating that the primitive, the draw call associated with the primitive, or both are visible in the tile and are to be rendered using the draw call index data. Additionally, in response to a primitive being present in the first tile, CPU 102, APU 114, or both increase the visible primitive count by, for example, one. Further, CPU 102, APU 114, or both increase the visible draw call count by, for example, one if the primitive visible in the first tile is the first primitive of a draw call determined to be visible. For example, in response to a primitive being present in the first tile, APU 114 determines if a preceding primitive (e.g., a primitive for which visibility has already been determined in the tiles) of the same draw call as the primitive was visible in the first tile. As an example, APU 114 checks a flag associated with the draw call to determine if a preceding primitive of the same draw call as the primitive was visible in the first tile. In response to determining that no preceding primitive of the same draw call as the primitive was visible in the first tile, the APU 114 increments the visible draw call count.

After the visible primitive count, visible draw count, or both equal or exceed a threshold value, APU 114 switches from pipeline delay reduction mode to a standard mode and begins storing visibility data (e.g., compressed index data) in a respective buffer as discussed above. That is to say, once the visible primitive count, visible draw count, or both reach a predetermined value, APU 114 switches to storing visibility data in a buffer and, once the data is flushed, using the flushed visibility data (e.g., compressed index data) to render the visible primitives in a tile (e.g., bin). In this way, the pipeline delay between the completion of the visibility passes and the rendering of the primitives is reduced as a predetermined number of primitives, draw calls, or both are rendered using draw call index data stored in on-chip memory 174 while the visibility pass is completed, visibility data is flushed from a buffer, or both. As such, the total time to render an image is reduced.

An input/output (I/O) engine 118 includes hardware and software to handle input or output operations associated with the display 120, as well as other elements of the processing system 100 such as keyboards, mice, printers, external disks, and the like. The I/O engine 118 is coupled to the bus 112 so that the I/O engine 118 communicates with the memory 106, the APU 114, or the CPU 102. In the illustrated implementation, the I/O engine 118 reads information stored on an external storage component 122, which is implemented using a non-transitory computer-readable medium such as a compact disk (CD), a digital video disc (DVD), and the like. The I/O engine 118 is also able to write information to the external storage component 122, such as the results of processing by the APU 114 or the CPU 102.

Figure 2:
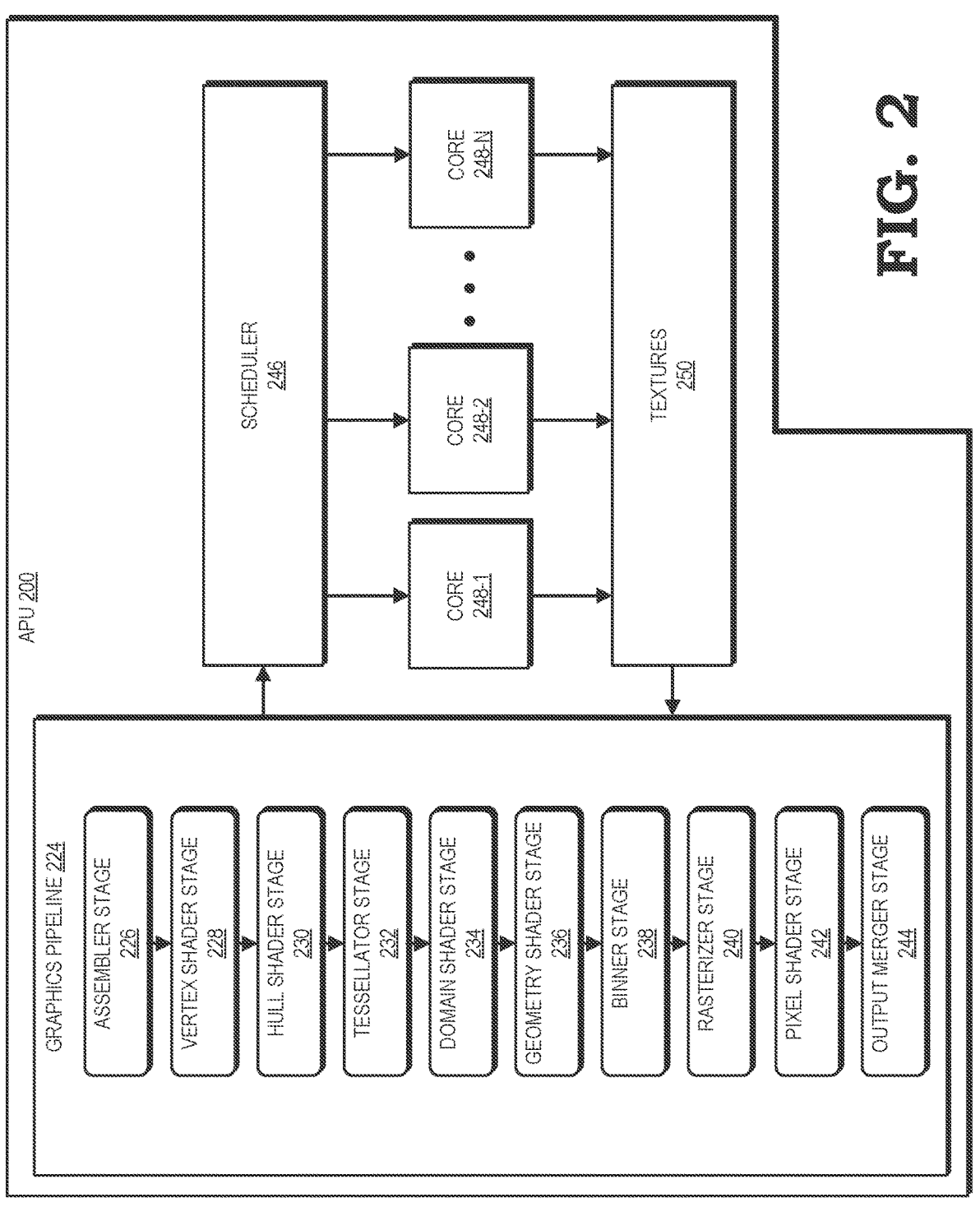
FIG. 2 is a block diagram of an accelerated processing unit configured to implement a graphics pipeline using coarse visibility compression, in accordance with some embodiments.

Referring now to FIG. 2, an APU 200 configured to implement a graphics pipeline 224 using coarse visibility compression is presented. In embodiments, APU, 200 similar to or the same as APU 114, is configured to render one or more textures 250 based on command stream received from an application 110 and including data for an image to be rendered. For example, a command stream includes a batch of draw calls indicating one or more primitives to be rendered for the image. To render the image indicated in the command stream, APU 200 is configured to render one or more primitives according to graphics pipeline 224, similar to or the same as graphics pipeline 124. Graphics pipeline 224 includes one or more steps, stages, or instructions to be performed by APU 200 in order to render one or more objects for an image to be rendered, for example, assembler stage 226, vertex shader stage 228, hull shader stage 230, tessellator stage 232, domain shader stage 234, geometry shader stage 236, binner stage 238, rasterizer stage 240, pixel shader stage 242, output merger stage 244, or any combination thereof.

Assembler stage 226 includes, for example, data and instructions for APU 200 to read and organize primitive data from a memory (e.g., memory 106), application 110, command stream, or any combination thereof, into one or more primitives to be rendered by the rest of graphics pipeline 224. Vertex shader stage 228 includes, for example, data and instructions for APU 200 to perform one or more operations on the primitives generated by assembler stage 226. Such operations include, for example, transformations (e.g., coordinate transformations, modeling transformations, viewing transformations, projection transformations, viewpoint transformations), skinning, morphing, and lighting operations. Hull shader stage 230, tessellator stage 232, and domain shader stage 234 together include, for example, data and instructions for APU 200 to implement tessellation for the primitives modified by vertex shader stage 228. Geometry shader stage 236 includes, for example, data and instructions for APU 200 to perform vertex operations on the tessellated primitives. Such vertex operations include, for example, point sprint expansion, dynamic particle system operations, fur-fin generation, shadow volume generation, single pass render-to-cubemap, per-primitive material swapping, and per-primitive material setup. Binner stage 238 includes, for example, data and instructions for APU 200 to perform coarse rasterization to determine if a tile (e.g., bin) of an image overlaps with one or more primitives (e.g., primitives modified by vertex shader stage 228). That is to say, binner stage 238 includes data and instructions for APU 200 to determine which primitives are present (e.g., visible) in a tile (e.g., bin) of an image. Rasterization stage 240 includes, for example, data and instructions for APU 200 to determine which pixels are included in each primitive and convert each primitive into pixels of the image. Pixel shader stage 242 includes, for example, data and instructions for APU 200 to determine the output values for the pixels determined during rasterization stage 240. Output merger stage 244 includes, for example, data and instructions for APU 200 to merge the output values of the pixels using, for example, z-testing and alpha blending.

According to embodiments, each instruction of a stage 226-244 of graphics pipeline 224 is performed by one or more cores 248, similar to or the same as cores 116, of APU 200. Though the example embodiment illustrated in FIG. 2 presents APU 200 having three cores (248-1, 248-2, 248-N) representing an N number of cores, in other embodiments, APU 200 may have any number of cores. Each instruction of graphics pipeline 224 is scheduled for execution by one or more cores 248 by scheduler 246. Scheduler 246 includes, for example, hardware and software configured to schedule tasks and instructions for the cores 248 of APU 200. In this way, two or more stages of graphics pipeline 224 are performed concurrently. In embodiments, graphics pipeline 224 includes a frontend that includes one or more stages of graphics pipeline 224 and a backend that includes one or more other stages of graphics pipeline 224. For example, graphics pipeline 224 includes a frontend that includes stages relating to tile-based (e.g., coarse tile-based) rendering (e.g., assembler stage 226, vertex shader stage 228, hull shader stage 230, tessellator stage 232, domain shader stage 234, geometry shader stage 236, binner stage 238) and a backend that includes stages relating to pixel-based rendering (e.g., rasterization stage 240, pixel shader stage 242, output merger stage 244). In embodiments, APU 200 is configured to perform one or more stages of the frontend of graphics pipeline 224 concurrently with one or more stages of the backend of graphics pipeline 224.

Figure 3:
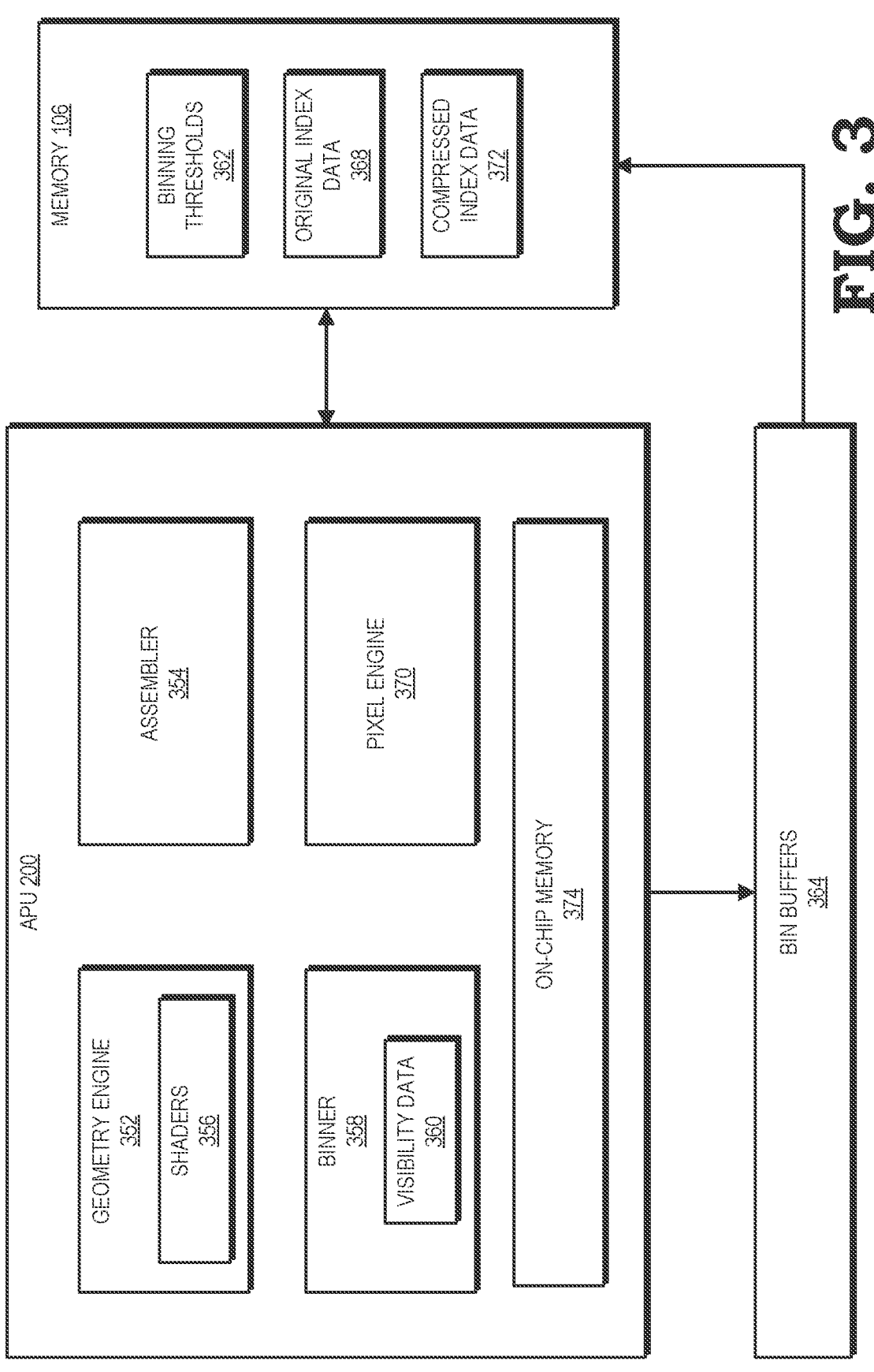
FIG. 3 is a block diagram of an accelerated processing unit configured to reduce pipeline delays due to coarse visibility compression, in accordance with some embodiments.

Referring now to FIG. 3, APU 200 configured to reduce pipeline delays due to coarse visibility compression is presented. In embodiments, APU 200 is configured to generate one or more textures 250 according to graphics pipeline 224. To this end, APU 200 includes assembler 354, geometry engine 352, shaders 356, binner 358, and on-chip memory 374, similar to or the same as on-chip memory 174. Assembler 354 includes, for example, hardware and software-based circuitry configured to implement one or more instructions from, for example, assembler stage 226 of graphics pipeline 224. That is to say, assembler 354 includes hardware and software-based circuitry configured to read and organize primitive data from a memory (e.g., memory 106), application 110, command stream, or any combination thereof into one or more primitives to be rendered. In embodiments, assembler 354 includes hardware and software-based circuitry configured to read and organize data output by one or more stages of graphics pipeline 224 such that the data is usable by one or more other stages of graphics pipeline 224. For example, assembler 354 is configured to read and organize data output by geometry shader stage 236 such that the data is usable by binner stage 238. Geometry engine 352 includes hardware and software-based circuitry to implement one or more instructions from one or more stages of the frontend of graphics pipeline 224, for example, vertex shader stage 228, hull shader stage 230, tessellator stage 232, domain shader stage 234, and geometry shader stage 236. As an example, geometry engine 352 includes one or more hardware and software shaders 356 configured to implement one or more instructions from one or more stages of the frontend of graphics pipeline 224. Binner 358 includes hardware and software-based circuitry configured to perform one or more visibility passes, one or more instructions from binner stage 238, or both. For example, binner 358 is configured to determine whether one or more primitives are visible in a tile and to store visibility data 360 indicating, for example, vertex data, shading data, positioning data of the visible primitives in a respective bin buffer 364. Pixel engine 370 includes hardware and software-based circuitry configured to implement one or more instructions from one or more stages of the backend of graphics pipeline 224, for example, rasterizer stage 240, pixel shader stage 242, and output merger stage 244.

According to embodiments, APU 200 is configured to concurrently perform one or more instructions associated with a frontend of graphics pipeline 224 and one or more instructions associated with a backend of graphics pipeline 224. For example, assembler 354, geometry engine 352, binner 358, or any combination thereof are configured to perform one or more tile-based rending instructions associated with a frontend of graphics pipeline 224 (e.g., assembler stage 226, vertex shader stage 228, hull shader stage 230, tessellator stage 232, domain shader stage 234, geometry shader stage 236, binner stage 238) for primitives in a first tile (e.g., bin) and pixel engine 370 is configured to perform one or more pixel-based rendering instructions associated with a backend of graphics pipeline 224 (e.g., rasterizer stage 240, pixel shader stage 242, output merger stage 244) for pixels in the first tile, a different second tile, or both.

In embodiments, geometry engine 352 is configured to implement instructions from the frontend of graphics pipeline 224 using original index data 368 that includes, for example, data representing vertices of one or more primitives of a texture 250 to be rendered by APU 114 (e.g., pointers to a vertex buffer). To help reduce the amount of time needed for geometry engine 352 to implement instructions from the front end of graphics pipeline 224, APU 200 is configured to generate compressed index data 372 that includes, for example, compressed data representing vertices of one or more primitives of a texture 250 to be rendered by APU 200. To this end, APU 200 is configured to receive a command stream from application 110 that indicates an image to be rendered. For example, the command stream indicates a batch of draw calls identifying one or more primitives to be rendered for an image. In response to receiving the command stream, assembler 354, geometry engine 352, or both are configured to perform instructions for one or more stages of the frontend of graphics pipeline 224 to generate one or more primitives. For example, assembler 354 is configured to implement instructions from assembler stage 226 and geometry engine 352 is configured to implement instructions from vertex shader stage 228, hull shader stage 230, tessellator stage 232, domain shader stage 234, geometry shader stage 236, or any combination thereof to generate one or more primitives. Binner 358 is then configured to divide the image into two or more tiles (e.g., bins) and perform a visibility pass for the image. That is to say, binner 358 determines which of the primitives generated by assembler 354 and geometry engine 352 are visible (e.g., present) in each tile.

Based on the visibility pass of the image, binner 358 is configured to generate visibility data 360 associated with a tile and store the visibility data 360 in a respective bin buffer 364. For example, during a visibility pass in response to determining a primitive is not visible (e.g., present) in a first tile, binner 358 is configured to provide visibility data 360 (e.g., a flag) to a respective bin buffer 364 (e.g., a bin buffer 364 associated with the first tile) indicating that the draw call of the primitive, the primitive, or both are not visible in the first tile. Additionally, in response to determining a primitive is visible (e.g., present) in the first tile, binner 358 is configured to provide visibility data 360 to the respective bin buffer 364 indicating vertex data, shading data, positioning data, or any combination thereof of the primitive. According to embodiments, binner 358 is configured to compress visibility data 360 before is provided and stored in bin buffers 364. In embodiments, APU 200, CPU 102, or both are configured to flush compressed visibility data 360 from bin buffers 364 into memory 106 in response to a threshold event. Such threshold events include, for example, a predetermined period of time (e.g., nanoseconds, milliseconds, seconds, minutes) elapsing, APU 200 completing a visibility pass, or both. For example, in response to completing a visibility pass APU 200 is configured to flush compressed visibility data 360 from a bin buffer 364 associated with the first tile into memory 106.

In embodiments, compressed visibility data 360 flushed from bin buffers 364 into memory 106 is available as compressed index data 372. That is to say, assembler 354, geometry engine 352, or both are configured to use compressed index data 372 to render one or more primitives of an image indicated in a batch of draw calls. Compressed index data 372 includes, for example, data representing vertices of one or more primitives of an image to be rendered by APU 200 (e.g., pointers to a vertex buffer). In embodiments, APU 200 is configured to render an image according to an ordering of one or more tiles and the respective visibility data 360 associated with tiles. For example, APU 200 is configured to render each primitive that is visible in a first tile of an image based on visibility data 360 (e.g., based on compressed index data 372 after visibility data 360 is flushed from a bin buffer 364). In response to rendering each primitive visible (e.g., present) in the first tile, APU 200 is configured to render the primitives visible in a next sequential tile (e.g., an adjacent tile to the first time). According to embodiments, APU 200 is configured to perform tile-based rendering (e.g., the frontend of graphics pipeline 224) for the primitives in a first tile currently with performing pixel-based rendering (e.g., the backend of graphics pipeline 224) for primitives in a second, different tile. For example, APU 200 concurrently performs tile-based rendering for primitives in a first tile and pixel-based rendering for primitives in a second tile where tile-based rendering has already been completed. By concurrently performing tile-based rendering and pixel-based rendering for primitives of different tiles, the time needed to render an image is reduced.

However, waiting to perform the frontend of graphics pipeline 224 (e.g., tile-based rendering) until the visibility pass is completed and the visibility data is flushed from the buffers introduces a delay in the graphics pipeline between the completion of the visibility passes and the rendering of the primitives. During such delays, pixel engine 370 remains idle until at least a portion of the front end of graphics pipeline 224 is completed, reducing the efficiency of the system. To help reduce such delays, APU 200 is configured to operate in a pipeline delay reduction mode.

During a pipeline delay reduction mode, assembler 354, geometry engine 352, binner 358, and pixel engine 370 are configured to render one or more visible primitives associated with one or more visible draw calls in a first tile while a visibility pass is being conducted, visibility data 360 is flushed from a bin buffer 364, or both. For example, assembler 354, geometry engine 352, and binner 358 are configured to perform one or more instructions from the frontend of graphics pipeline 224 (e.g., tile-based rendering) while visibility data 360 is being flushed from a bin buffer 364 and pixel engine 370 is configured to perform one or more instructions of the backend of graphics pipeline 224 (e.g., pixel-based rendering) on one or more primitives rendered during the instructions from the frontend of graphics pipeline 224. To render one or more visible primitives in a tile while a visibility pass is being conducted, visibility data 360 is being flushed from a bin buffer 364, or both, APU 200 is configured to keep a visible primitive count (e.g., the number of currently determined visible primitives in the first tile), a visible draw call count (e.g., the number of draw calls including a currently determined visible primitive in the first tile), or both for a first tile (e.g., bin). APU 200 is further configured to compare the visible primitive count, visible draw call count, or both to one or more binning thresholds 362 which include, for example, data representing a predetermined number (e.g., maximum number) of primitives to render in pipeline delay reduction mode, a predetermined number (e.g., maximum number) of draw calls to render in the pipeline delay reduction mode, or both. In embodiments, APU 200 is configured to render one or more visible primitives in a tile based on the comparison of the visible primitive count, visible draw call count, or both to one or more binning thresholds 362.

As an example, in response to APU 200 receiving a command stream from an application 110 indicating a batch of draw calls for an image to be rendered, assembler 354, geometry engine 352, binner 358, or any combination thereof performs a visibility pass for the image based on one or more primitives indicated in the batch of draw calls. During the visibility pass, APU 200 compares the visible primitive count, visible draw call count, or both to one or more binning thresholds 362 and renders visible primitives based on the comparison. For example, in response to the visible primitive count, visible draw call count, or both being less than one or more binning thresholds 362, APU 200 is configured to render one or more visible primitives of one or more visible draw calls in a pipeline delay reduction mode. In response to the visible primitive count, visible draw call count, or both being equal to or greater than one or more binning thresholds 362, APU 200 is configured to operate in a standard mode and stores visibility data 360 in a respective bin buffer 364 and renders visible primitives using compressed index data 372 once visibility data 360 is flushed from the bin buffer 364.

While in the pipeline delay reduction mode and in response to no primitives of a draw call being present (e.g., visible) in the first tile, APU 200 generates visibility data 360 (e.g., a flag) indicating that the draw call is not visible in the first tile and that the primitives of the draw call, the draw call, or both are not to be rendered for the first tile. APU 200 provides such visibility data to a data structure (e.g., array) that is stored in on-chip memory 374. In response to a primitive of a draw call being visible in the first tile, APU 200 stores the draw call index data associated with the primitive (e.g., a pointer to the draw call associated with the primitive, a number of indices in the draw call) in on chip-memory 374 and generates visibility data 360 (e.g., a flag) indicating that the primitive, the draw call associated with the draw call, or both are visible in the tile and are to be rendered using the draw call index data. For example, assembler 354, geometry engine 352, binner 358, or any combination thereof perform one or more instructions from the frontend of graphics pipeline 224 (e.g., tile-based rendering) for the visible primitives of visible draw calls using the draw call index data stored in on-chip memory 374 and pixel engine 370 performs one or more step of the backend of graphics pipeline 224 (e.g., pixel-based rendering) for the visible primitives rendered by assembler 354, geometry engine 352, binner 358, or any combination thereof. Additionally, in response to a primitive being present in the first tile, APU 200 increases the visible primitive count by, for example, one. Further, APU 200 increases the visible draw call count by, for example, one if the primitive is the first determined visible primitive of a draw call. For example, in response to a primitive being present in the first tile, APU 200 determines if a preceding primitive (e.g., a primitive for which visibility has already been determined in the tiles) of the same draw call as the primitive was visible in the first tile. As an example, APU 200 checks a flag associated with the draw call to determine if a preceding primitive of the same draw call as the primitive was visible in the first tile. In response to determining that no preceding primitive of the same draw call was visible in the first tile, APU 200 increments the visible draw call count. In this way, the pipeline delay between the completion of the visibility passes and the rendering of the primitives is reduced as a predetermined number of primitives are rendered using the draw call index data stored in on-chip memory 374 while the visibility data is flushed from the bin buffers 364. As such, the time that pixel engine 370 remains idle waiting for one or more instructions from the frontend of graphics pipeline 224 to be completed is also reduced, increasing the efficiency of the system.

Figure 4:
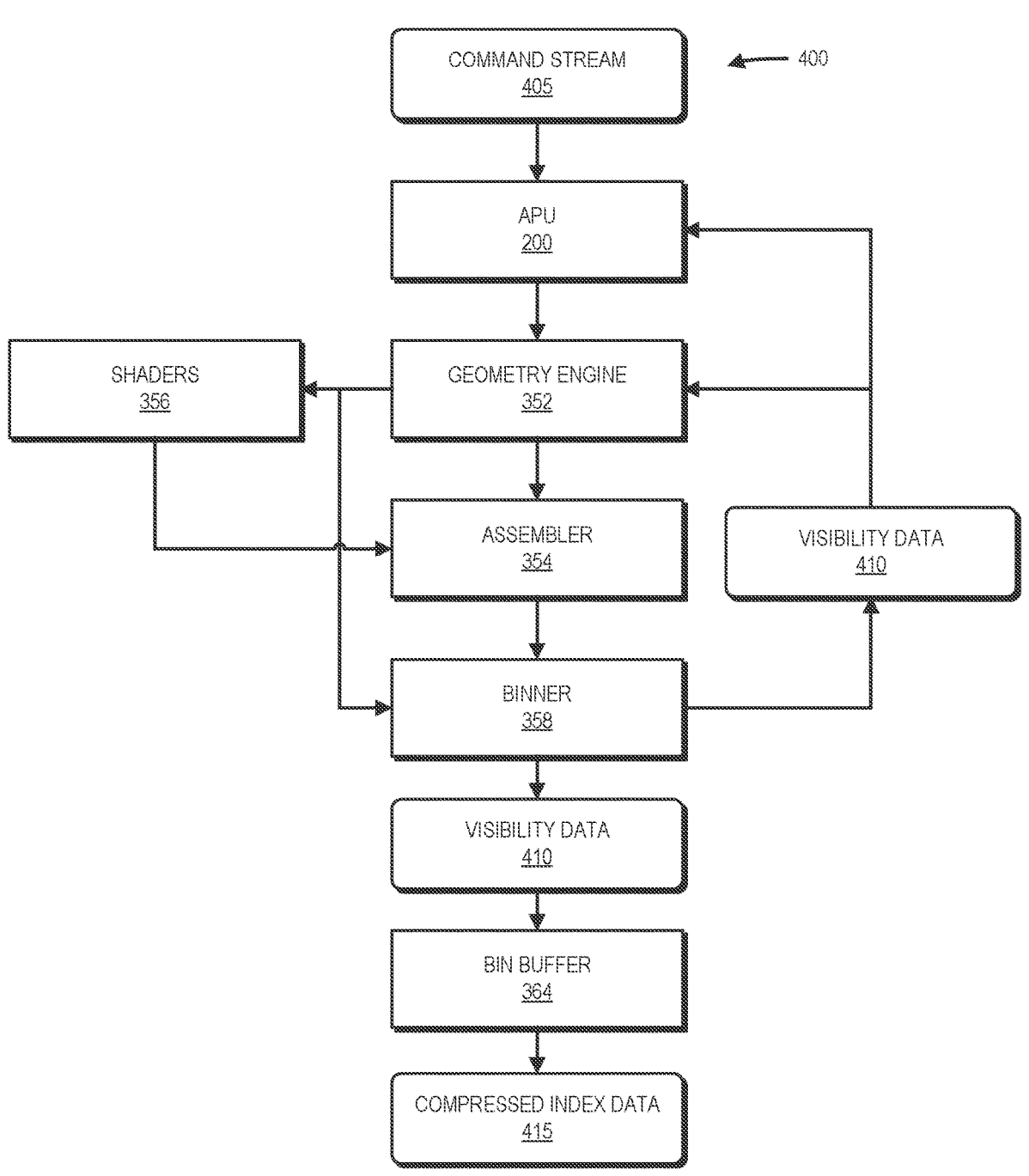
FIG. 4 is a flow diagram of an example operation for reducing pipeline delays due to visibility passes in coarse visibility compression, in accordance with some embodiments.

Referring now to FIG. 4, an example operation 400 for reducing pipeline delays due to visibility passes in coarse visibility compression is presented. In embodiments, operation 400 includes APU 200 receiving a command stream 405. Command stream 405 includes, for example, data generated by an application 110 indicating a batch of draw calls for one or more primitives to be rendered for textures, images, or both. In response to receiving command stream 405, APU 200 (e.g., assembler 354) is configured to read and organize primitive data indicated in command stream 405 into one or more primitives to be rendered by one or more stages of graphics pipeline 224. After reading and organizing the primitive data indicated in command stream 405, geometry engine 352 begins rendering one or more primitives to be rendered indicated in command stream 405. For example, geometry engine 352 performs one or more instructions from one or more stages associated with the frontend of graphics pipeline 224 (e.g., vertex shader stage 228, hull shader stage 230, tessellator stage 232, domain shader stage 234, geometry shader stage 236). To perform one or more instructions from one or more stages associated with the frontend of graphics pipeline 224, geometry engine 352 is configured to use shaders 356. The operation 400 further includes proving the data generated from geometry engine 352, shaders 356, or both performing one or more instructions from one or more stages associated with the frontend of graphics pipeline 224, to assembler 354, binner 358, or both. For example, the operation 400 includes geometry engine 352, shaders 356, or both providing data generated from performing one or more instructions of geometry shader stage 236 to assembler 354. In response to assembler 354 receiving the data generated from geometry engine 352, shaders 356, or both performing one or more instructions from one or more stages associated with the frontend of graphics pipeline 224, assembler 354 organizes the data such that it is usable by binner 358. For example, assembler 354 organizes the data into one or more primitives. As another example, the operation 400 includes geometry engine 352, shaders 356, or both providing data generated from performing one or more instructions of the frontend of graphics pipeline 224 to binner 358. Binner 358 uses such data, for example, to perform a visibility pass for two or more tiles of an image.

In response to receiving one or more primitives from assembler 354, binner 358 is configured to divide the image to be rendered into two or more tiles and to perform a visibility pass for the tiles of the image. In embodiments, binner 358 is configured to perform a visibility pass based on whether APU 200 is operating in a standard mode or in a pipeline delay reduction mode. To determine the operating mode of APU 200, APU 200 is configured to compare a visible primitive count (e.g., indicating a current number of primitives determined to be visible in a tile), visible draw call count (e.g., indicating a current number of draw calls issued for primitives determined to be visible in a tile), or both to one or more binning thresholds 362. For example, APU 200 is configured to compare a visible primitive count to a predetermined visible primitive count threshold (e.g., indicating a maximum number of visible primitives) and a visible draw call count to a visible draw call count threshold (e.g., indicating a maximum number of draw calls with visible primitives). In response to the visible primitive count, the visible draw call count, or both being less than one or more binning thresholds 362, APU 200 is configured to operate in a pipeline delay reduction mode. For example, in response to the visible primitive count being less than a visible primitive count threshold and the visible draw call count being less than a visible draw call count threshold, APU is configured to operate in a pipeline delay reduction mode. In response to the visible primitive count, the visible draw count, or both being equal to or greater than one or more binning thresholds 362, APU 200 is configured to operate in a standard mode. For example, in response to the visible primitive count being equal to or greater than a visible primitive count threshold or in the visible draw call count being equal to or greater than a visible draw call count threshold, APU 200 is configured to operate in a standard mode.

While APU 200 is operating in a pipeline delay reduction mode, operation 400 includes binner 358 generating visibility data 410, similar to or the same as visibility data 360, for a first tile (e.g., bin) of an image based on the primitives of the draw calls provided by assembler 354. For example, for a first tile, binner 358 determines if each primitive of a draw call provided by assembler 354 is visible (e.g., present) in the first tile. In response to no primitive of a draw call being visible (e.g., present) in the first tile, binner 358 generates visibility data 410 that includes data (e.g., a flag) indicating that the draw call is not visible in the first tile. Such data is stored, for example, in an array of on-chip memory 374. In response to a primitive being visible (e.g., present) in the first tile, binner 358 stores the draw call index data associated with the primitive in on-chip memory 374 and generates visibility data 410 that includes data (e.g., a flag) indicating that the draw call, the primitive, or both are visible in the tile and are to be rendered using the draw call index data. Such data is stored, for example, in an array of on-chip memory 374. Additionally, in response to a primitive being visible (e.g., present) in the first tile, binner 358 increments the visible primitive count by, for example, one. Further, in response to a primitive being visible (e.g., present) in the first tile, binner 358 increments the visible draw call count by, for example, one if the primitive is the first determined visible primitive of a draw call. For example, in response to a primitive being present in the first tile, binner 358 determines if a preceding primitive (e.g., a primitive for which visibility has already been determined in the tiles) of the same draw call as the primitive was visible in the first tile. In response to determining that no preceding primitive of the same draw call was visible in the first tile, binner 348 increments the visible draw call count. In embodiments, the visibility data 410 in the array of memory 106 is provided to APU 200, geometry engine 352, or both, to render one or more primitives of one or more draw calls determined to be visible in the first tile. To this end, for example, APU 200, geometry engine 352, or both are configured to render one or more primitives identified in a batch of draw calls indicated in command stream 405 according to the visibility data 410 in on-chip memory 374. As an example, in response to visibility data 410 indicating a draw call indicated in the command stream 405 is not visible in a first tile, APU 200, geometry engine 352, or both are configured to skip rendering of the primitives indicated in the draw call in the first tile. In response to visibility data 410 indicating a draw call indicated in command stream 405 is visible in a first tile, APU 200, geometry engine 352, CPU 102, or any combination thereof render the primitives of the draw call using the draw call index data stored in on-chip memory 374.

While operating in a standard mode, operation 400 also includes binner 358 generating visibility data 410, similar to or the same as visibility data 360, for each tile of an image based on each remaining primitive provided by assembler 354 (e.g., primitives not examined during a visibility pass while APU was operating in the pipeline delay reduction mode). For example, for a first tile, binner 358 determines if each remaining primitive provided by assembler 354 is visible (e.g., present) in the first tile. In response to a remaining primitive not being visible (e.g., present) in the first tile, binner 358 generates visibility data 410 that includes data (e.g., a flag) indicating that the primitive is not visible in the first tile. Such data is stored, for example, in a respective bin buffer 364 (e.g., a bin buffer associated with the first tile). In response to a remaining primitive being visible (e.g., present) in the first tile, binner 358 generates visibility data 410 that includes data indicating the primitive is visible in the tile (e.g., a flag) and indicating vertex data, shading data, positioning data, or any combination thereof, of the primitive. Such data is also stored, for example, in a respective bin buffer 364. According to embodiments, APU 200 is configured to compress visibility data 410 before it is stored in a bin buffer 364. In embodiments, operation 400 includes APU 200, CPU 102, or both flushing visibility data 410 from a respective bin buffer 364 to memory 106. For example, in response to a threshold event (e.g., a predetermined period of time elapsing, binner 358 completing a visibility pass for a tile, or both) APU 200 is configured to flush visibility data 410 in a buffer to memory 106. After compressed visibility data 410 is flushed from a bin buffer 364 to memory 106, APU 200, geometry engine 352, or both are configured to render one or more primitives identified in a batch of draw calls indicated in command stream 405 based on the flushed visibility data 410. For example, in response to the flushed visibility data 410 indicating a primitive indicated in command stream 405 is not visible in a first tile, APU 200, geometry engine 352, or both skip rendering of that primitive. In response visibility data 410 indicating a primitive indicated in command stream 405 is visible in the first tile, APU 200, geometry engine 352, CPU 102, or any combination thereof render the primitive using the flushed visibility data 410 as compressed index data 415 that includes compressed data indicating the vertex data, shading data, positioning data, or any combination thereof, of the primitive. In this way, APU 200 uses compressed index data 415 to render the primitives of command stream 405 which improves rendering times. Additionally, APU 200 reduces pipeline delays caused by waiting for the compressed index data 415 to be flushed from bin buffers 364 by first rendering a predetermined number of primitives using draw call index data stored in on-chip memory 374 while APU 200 operates in the pipeline delay reduction mode.

Figure 5:
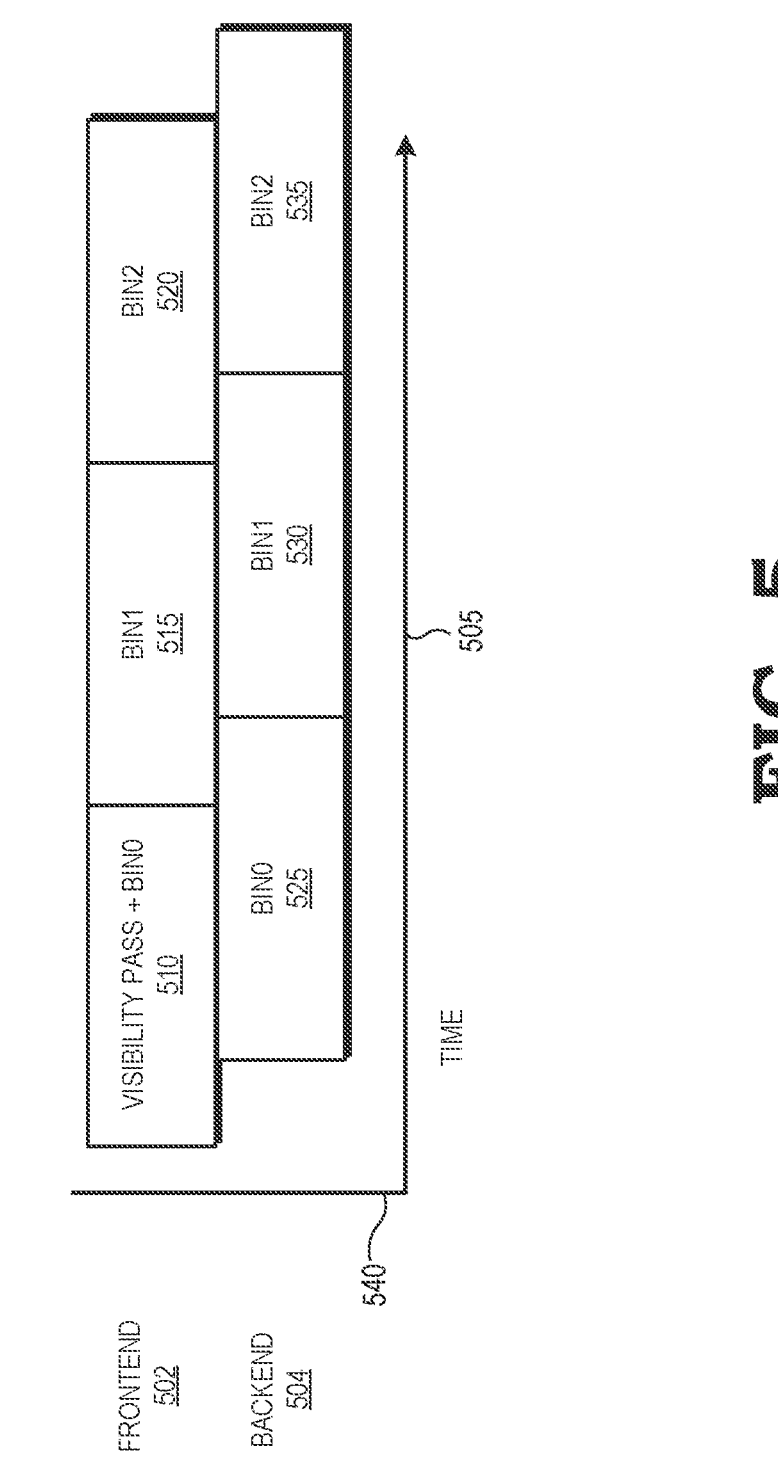
FIG. 5 is a timing diagram illustrating an example reduction in pipeline delays due to coarse visibility compression, in accordance with some embodiments.

Referring now to FIG. 5, an example timing diagram 500 illustrating an example reduction in pipeline delays in coarse visibility compression is presented. For example, the timing diagram 500 includes a first axis 505 indicating time and a second axis 540 indicating the frontend 502 of graphics pipeline 224 and the backend 504 of graphics pipeline 224. The frontend 502 includes one or more stages associated with tile-based (e.g., bin-based) rendering (e.g., assembler stage 226, vertex shader stage 228, hull shader stage 230, tesselator stage 232, domain shader stage 234, geometry shader stage 236, binner stage 238) and backend 504 includes one or more stages associated with pixel-based rendering (e.g., rasterizer stage 240, pixel shader stage 242, output merger stage 244). APU 200 is configured to perform a visibility pass and tile-based rendering for one or more primitives visible in a first bin (e.g., tile) bin0 at a first time 510, perform tile-based rendering for one or more primitives visible in a second bin (e.g., tile) bin1 at a second time 515, and perform tile-based rendering for one or more primitives visible in a third bin (e.g., tile) bin2 at a third time 520. Further, APU 200 is configured to perform pixel-based rendering for one or more primitives visible in the first bin, bin0, and processed by frontend 502 at a fourth time 525, perform pixel-based rendering for one or more primitives visible in the second bin, bin1, and processed by frontend

502 at a fifth time 530, and perform pixel-based rendering for one or more primitives visible in the third bin, bin2, and processed by frontend 502 at a sixth time 535.

In embodiments, for at least a portion of the first time 510, APU 200 is configured to operate in a pipeline delay reduction mode such that APU 200 concurrently performs a visibility pass, flushing visibility data from a bin buffer, or both while rendering a predetermined number of visible primitives of one or more visible draw calls in bin0 using draw call index data stored in on-chip memory 374. For example, APU 200 renders visible primitives in bin0 using draw call index data stored in on-chip memory 374 while a visible primitive count, visible draw call count, or both are less than one or more bin thresholds 362 (e.g., visible primitive count threshold, visible draw call count threshold). After the visible primitive count, visible draw call count, or both equal or exceed one or more binning thresholds 362, APU 200 switches to a standard mode for the remainder of the first time 510 and at fourth time 525. In this way, APU performs a visibility pass, flushes visibility data from a bin buffer, or both concurrently with tile-based rendering of one or more primitives visible in bin0 and pixel-based rendering of one or more primitives visible in bin0 (indicated by the overlap of first time 510 and fourth time 525) helping to reduce delays in the pipeline due to waiting for visibility data 410 to be flushed from one or more bin buffers 364.

Figure 6:
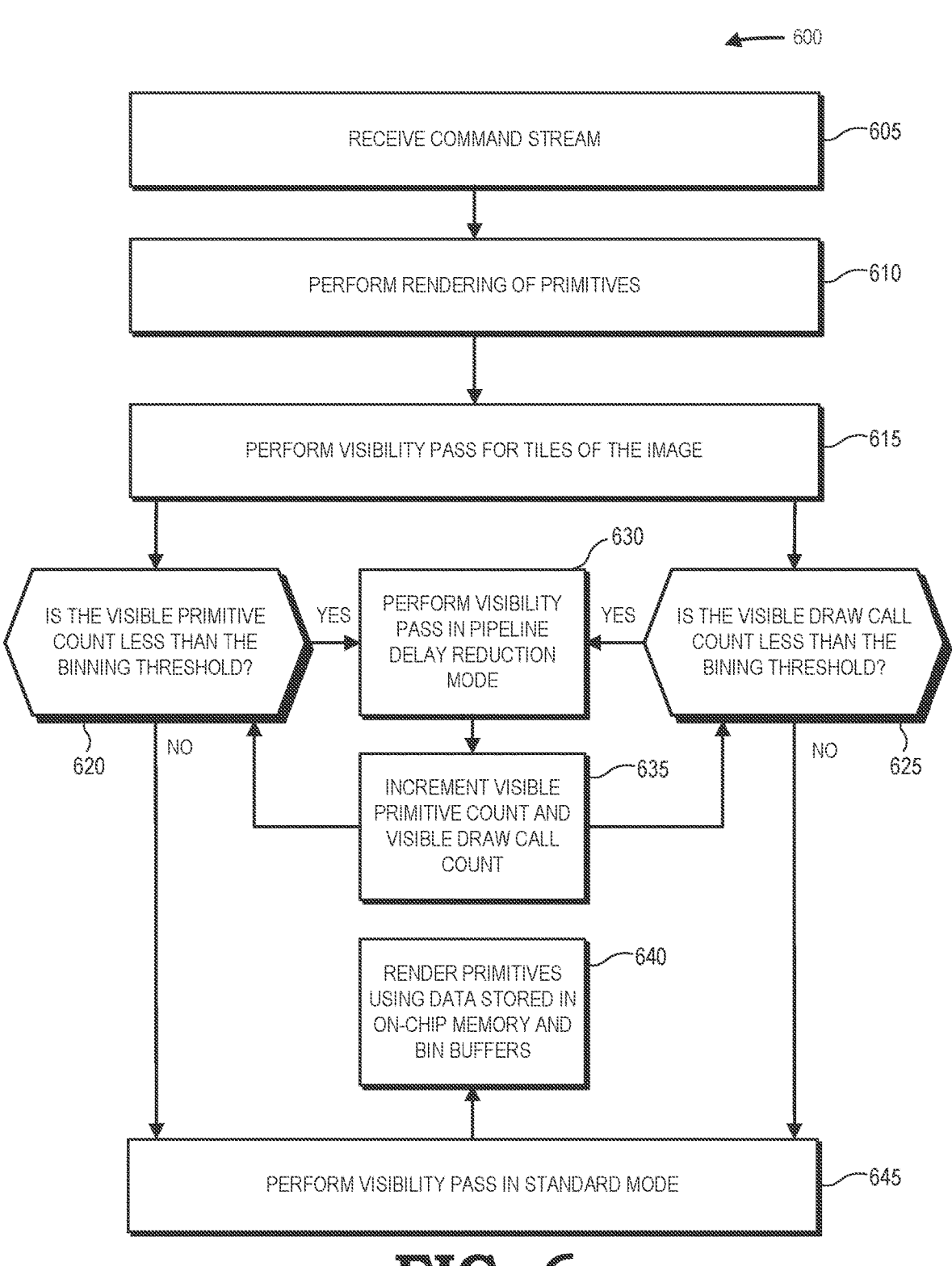
FIG. 6 is a flow diagram of an example method for reducing pipeline delays due to coarse visibility compression, in accordance with some embodiments.

Referring now to FIG. 6, an example method 600 for reducing pipeline delays in coarse visibility compression is presented. At step 605, an APU, similar to or the same as APU 114, 200, receives a command stream, similar to or the same as command stream 405, indicating a batch of draw calls identifying one or more primitives to be rendered for one or more textures, images, or both. For example, the APU receives a command stream from an application 110 indicating one or more primitives to be rendered for one or more textures, images, or both. At step 610, the APU performs one or more operations to at least partially render the primitives indicated in the command stream. For example, the APU performs one or more instructions from one or more stages (e.g., assembler stage, vertex shader stage, hull shader stage, tessellator stage, domain shader stage, geometry shader stage) of the frontend of a graphics pipeline, similar to or the same as graphics pipeline 224 to at least partially render the primitives indicated in the command stream. At step 615, the APU performs a visibility pass for the image indicated in the command stream. To perform the visibility pass, the APU first divides the image into two or more tiles each including a number of pixels in a first direction (e.g., horizontal) and second number of pixels in a second direction (e.g., vertical). The APU then performs a visibility pass for the tiles (e.g., bins) of the image to determine which of the primitives indicated in the command stream are visible (e.g., present) in the tiles.

At steps 620 and 625 the APU determines whether to operate in a pipeline delay reduction mode or standard mode while performing the visibility pass. In some embodiments, the processing system 100 performs steps 620 and 625 concurrently while in other embodiments the processing system 100 performs steps 620 and 625 sequentially (e.g., step 620 then step 625; step 625 then step 620). Referring to step 620, the APU determines whether a visible primitive count (e.g., a count representing a number of primitives currently determined to be visible in the first tile) is less than one or more binning thresholds, similar to or the same as binning thresholds 362. For example, the APU determines whether a visible primitive count is less than a visible primitive count threshold representing a predetermined number (e.g., maximum number) of visible primitives. Referring to step 625, the APU determines whether a visible draw call count (e.g., a count representing a number of draw calls currently determined to include visible primitives) is less than one or more binning thresholds, similar to or the same as binning thresholds 362. For example, the APU determines whether a visible draw call count is less than a visible draw call count threshold representing a predetermined number (e.g., maximum number) of draw calls including visible primitives. In some embodiments, in response to both the visible primitive count being less than one or more binning thresholds (e.g., visible primitive count threshold) and the visible draw call count being less than one or more binning thresholds (e.g., visible draw call count threshold), the system moves to step 630 while in other embodiments, in response to either the visible primitive count being less than one or more binning thresholds (e.g., visible primitive count threshold) and the visible draw call count being less than one or more binning thresholds (e.g., visible draw call count threshold), the system moves to step 630. Likewise, in some embodiments, in response to either the visible primitive count being equal to or greater than one or more binning thresholds (e.g., visible primitive count threshold) and the visible draw call count being equal to or greater than one or more binning thresholds (e.g., visible draw call count threshold), the processing system 100 moves to step 645, while in other embodiments, in response to both the visible primitive count being equal to or greater than one or more binning thresholds (e.g., visible primitive count threshold) and the visible draw call count being equal to or greater than one or more binning thresholds (e.g., visible draw call count threshold), the system moves to step 645.

At step 630, the APU performs the visibility pass for the tiles of the image while operating in a pipeline delay reduction mode. While operating in the pipeline delay reduction mode, the APU generates visibility data, similar to or the same as visibility data 360, 410, for a first tile (e.g., bin) of the image based on whether each of the primitives identified in a draw call indicated in the command stream (e.g., as rendered at step 610) are visible (e.g., present) in the first tile. Still referring to step 630, in response to no primitives of a draw call being visible (e.g., present) in the first tile, the APU generates visibility data that includes data (e.g., a flag) indicating that the draw call is not visible in the first tile (e.g., the primitives of the draw call are not to be rendered in the first tile) and stores the visibility data in an on-chip memory, similar to or the same as on-chip memory 174, 374. In response to a primitive of a draw call being visible (e.g., present) in the first tile, the APU stores the draw call index data associated with the primitive in the on-chip memory and generates visibility data that includes data (e.g., a flag) indicating that the draw call, the primitive, or both are visible in the tile and are to be rendered using the draw call index data stored in the on-chip memory. In response to determining that a first primitive of a draw call is visible in the first tile, the processing system 100 moves to step 635. At step 635, the APU, CPU 102, or both increments the visible primitive count by, for example, one. Further, at step 635, the APU, CPU 102, or both increments the visible draw call count by, for example, one if the first primitive is the first determined visible primitive of a draw call. For example, in response to the first primitive being visible in the first tile, the APU determines if a preceding primitive (e.g., a primitive for which visibility has already been determined in the tiles) of the same draw call as the first primitive was visible in the first tile. As an example, the APU checks a flag associated with the draw call to determine if a preceding primitive of the same draw call as the first primitive was also visible in the first tile. In response to determining that no preceding primitive of the same draw call was visible in the first tile, the APU increments the visible draw call count. After incrementing the visible primitive count, visible draw call count, or both, the system moves back to steps 620 and 625 where the APU determines whether to continue to operate in a pipeline delay reduction mode or switch to a standard mode while performing the visibility pass.

At step 645, the APU performs the visibility pass for the image while operating in a standard mode. While operating in the standard mode, the APU generates visibility data, similar to or the same as visibility data 360, 410, for tiles (e.g., bins) of the image based of whether each of the primitives indicated in the command stream (e.g., as rendered at step 610) are visible (e.g., present) in the tiles. Still referring to step 645, in response to a primitive not being visible (e.g., present) in a tile, the APU generates visibility data that includes data (e.g., a flag) indicating that the primitive is not visible in the tile. In response to a primitive being visible (e.g., present) in the tile, the APU generates visibility data that includes data (e.g., a flag) indicating that the primitive is visible in the tile and data indicating vertex data, shading data, positioning data, or any combination thereof, of the primitive. While the APU operates in the standard mode, the APU stores generated visibility data in a respective bin buffer, similar to or the same as bin buffers 364. For example, the APU stores generated visibility data in a bin buffer associated with a respective tile of the image. According to embodiments, the APU first compresses the generated visibility data before storing it in a respective bin buffer. In embodiments, the APU flushes visibility data out of a respective primitive buffer and into memory 106 in response to a threshold event (e.g., a predetermined period of time, the APU completing a visibility pass, or both). Visibility data flushed from the bin buffer into memory 106 is then available as compressed index data, similar to or the same as compressed index data 372, 415, for rendering one or more primitives determined to be visible in the first time.

At step 640, after completing the visibility pass for the image, the APU renders one or more primitives identified in one or more determined visible draw calls using the draw call index data stored in the on-chip memory, visibility data flushed from the bin buffers, or both. For example, the APU renders one or more primitives using the draw call index data stored in the on-chip memory while visibility data is flushed from the bin buffers. In response to the visibility data being flushed from the bin buffers, the APU renders primitives using the visibility data flushed from the bin buffers.

In some embodiments, the apparatus and techniques described above are implemented in a system including one or more integrated circuit (IC) devices (also referred to as integrated circuit packages or microchips), such as the operation to help eliminate pipeline delays described above with reference to FIGS. 1-6. Electronic design automation (EDA) and computer-aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer-readable storage medium accessible to the computing system. Likewise, the code representative of one or more phases of the design or fabrication of an IC device may be stored in and accessed from the same computer-readable storage medium or a different computer-readable storage medium.

A computer-readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM), or other non-volatile memory device or devices, and the like. The executable instructions stored on the non-transitory computer-readable storage medium may be in source code, assembly language code, object code, or another instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
performing, based on a command stream, a visibility pass for an image to determine a plurality of primitives visible in a tile of the image; and
concurrently with the visibility pass and prior to flushing any visibility data of the plurality of primitives visible in the tile from a buffer associated with the tile, initiating rendering of a first primitive of the plurality of primitives visible in the tile using data stored in an on-chip memory based on a relationship between a visible primitive count to a binning threshold.

2. The method of claim 1, wherein the visibility pass includes:
in response to a current primitive being visible in the tile, incrementing the visible primitive count.

3. The method of claim 1, further comprising:
during the visibility pass, based on the visible primitive count being less than the binning threshold, generating data indicating the first primitive is to be rendered using draw call index data stored in the on-chip memory and not the visibility data of the plurality of primitives visible in the tile that is flushed from the buffer associated with the tile.

4. The method of claim 3, wherein the visible primitive count represents a running total of primitives currently determined to be visible in the tile during the visibility pass.

5. The method of claim 1 further comprising:
rendering a second primitive of the plurality of primitives visible in the tile using the visibility data of the plurality of primitives after it is flushed from the buffer associated with the tile.

6. The method of claim 5, further comprising:
compressing all the visibility data of the plurality of primitives visible in the tile to produce compressed visibility data; and
storing the compressed visibility data in the buffer associated with the tile.

7. The method of claim 6, further comprising:
concurrently with flushing the compressed visibility data from the buffer, rendering a third primitive of the plurality of primitives visible in the tile.

8. A method comprising:
during a visibility pass for a plurality of primitives and in response to a current primitive of the plurality of primitives associated with a draw call being visible in a tile of an image, incrementing a visible draw call count representing a number of draw calls associated with primitives currently determined to be visible in the tile by the visibility pass;
generating visibility data for the current primitive based on a relationship between the visible draw call count and a threshold; and
rendering the current primitive based on the visibility data.

9. The method of claim 8, wherein generating the visibility data comprises:

based on the visible draw call count being less than the threshold, generating visibility data indicating the current primitive is to be rendered based on draw call index data stored in an on-chip memory and not visibility data flushed from a buffer associated with the tile.

10. The method of claim 9, further comprising:

during the visibility pass for the plurality of primitives and in response to a second current primitive of the plurality of primitives associated with a second draw call being visible in a tile of an image, incrementing the visible draw call count.

11. The method of claim 9, further comprising:

during the visibility pass for the plurality of primitives and in response to a third current primitive of the plurality of primitives associated with the draw call being visible in a tile of an image, not incrementing the visible draw call count.

12. The method of claim 8, further comprising:

based on the visible draw call count being equal to or greater than the threshold, generating visibility data indicating vertex data of the current primitive.

13. The method of claim 12, further comprising:

compressing the visibility data to produce compressed visibility data; and storing the compressed visibility data in a buffer associated with the tile.

14. The method of claim 13, further comprising:

flushing the compressed visibility data from the buffer into a memory, wherein the current primitive is rendered using the visibility data flushed from the buffer.

15. A processor, comprising:

one or more processing units including circuitry configured to:

perform a visibility pass for an image based on a command stream to determine a plurality of primitives visible in a tile of the image; and concurrently with the visibility pass and prior to flushing any visibility data of the plurality of primitives visible from a buffer associated with the tile, begin rendering a first primitive of the plurality of primitives visible in the tile using data stored in an on-chip memory based on a relationship between a visible primitive count to a binning threshold.

16. The processor of claim 15, further comprising:

during the visibility pass in response to a current primitive being visible in the tile, incrementing the visible primitive count.

17. The processor of claim 15, wherein the one or more processing units include circuitry configured to:

based on the visible primitive count being less than the binning threshold, generate data indicating the first primitive is to be rendered using draw call index data stored in the on-chip memory and not the visibility data of the plurality of primitives visible in the tile that is flushed from the buffer associated with the tile.

18. The processor of claim 17, wherein the visible primitive count represents a running total of primitives currently determined to be visible in the tile during the visibility pass.

19. The processor of claim 15, wherein the one or more processing units include circuitry configured to:

render a second primitive of the plurality of primitives visible in the tile using visibility data of the plurality of primitives visible in the tile flushed from the buffer associated with the tile.

20. The processor of claim 19, wherein the one or more processing units include circuitry configured to:

based on the visible primitive count being equal to or greater than the binning threshold, generate visibility data associated with the second primitive;

compress all the visibility data of the plurality of primitives visible in the tile to produce compressed visibility data;

store the compressed visibility data in the buffer associated with the tile; and concurrently with flushing the compressed visibility data from the buffer, render a third primitive of the plurality of primitives visible in the tile.

* * * * *